July 12, 1938.  E. P. RENAUX ET AL  2,123,578
ENGINE MOUNT
Filed Dec. 9, 1935   2 Sheets-Sheet 2
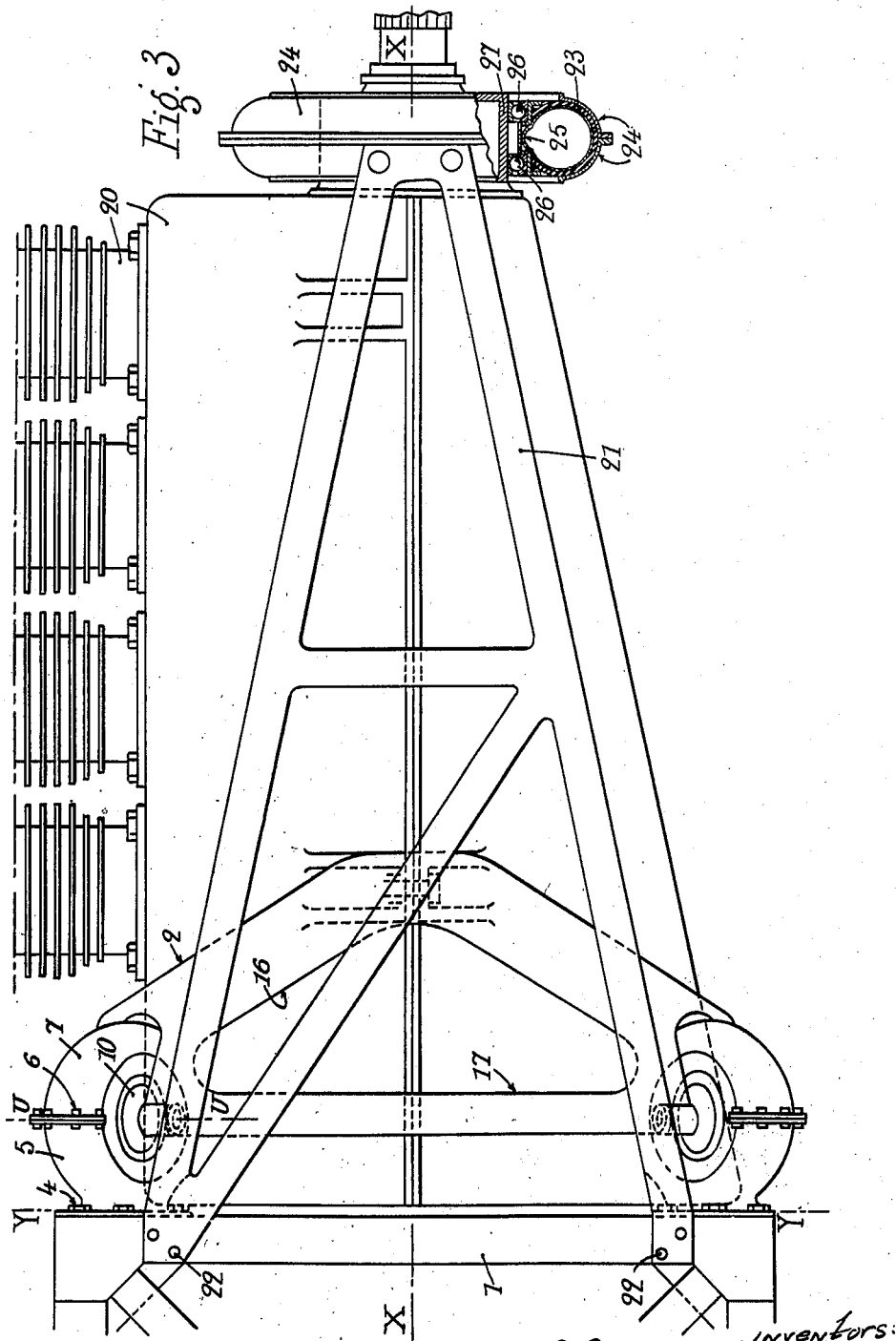

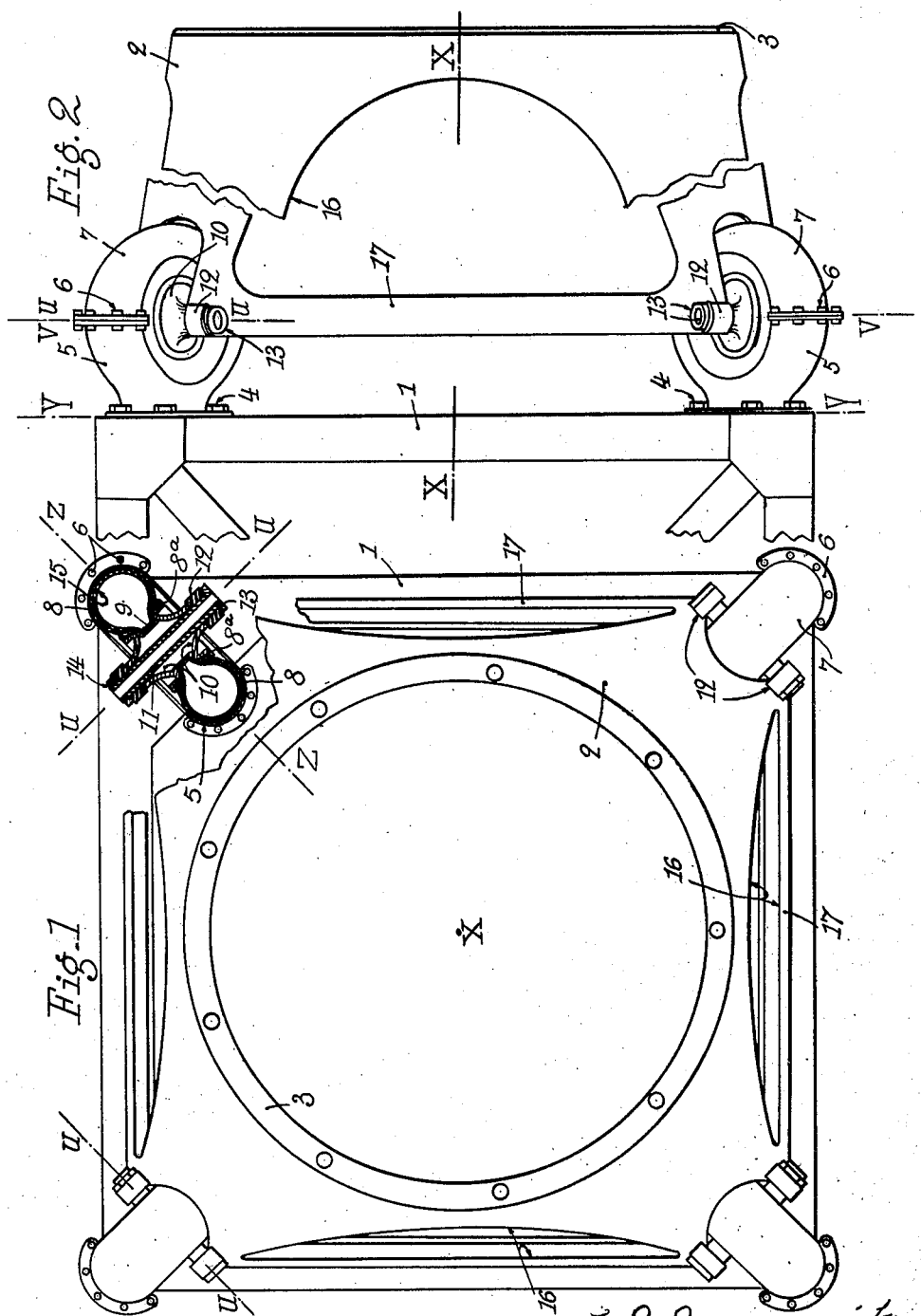

Patented July 12, 1938

2,123,578

UNITED STATES PATENT OFFICE 2,123,578

ENGINE MOUNT

Eugène Prosper Renaux, Paris, and Lucien Jules Renaux, Gargan-Livry, France

Application December 9, 1935, Serial No. 53,668
In France December 17, 1934

2 Claims. (Cl. 248—5)

The present invention has for its object an improved device for mounting either an engine upon its support, which support may consist of a frame for example of a test bed or of the chassis of a land or water vehicle; or an engine and propeller or an engine and tractor apparatus on the structure of a flying machine; or further, and in a more general manner, any apparatus comprising one or more parts having a movement of rotation or of oscillation, to a support or frame of any kind.

The said device is chiefly characterized by the fact that the engine or other apparatus to be so mounted is connected, directly or not, to its support by a certain number of rings or other members formed by revolution or the like, which are adapted for elastic deformation according to their axis of revolution, but will withstand radial deformations, and which are so arranged that the effect of the reaction torque produced by the parts in rotation or in oscillation will be exerted upon each of the said rings or like members according to its axis or to a direction very near this axis.

Inasmuch as each elastic ring or like member is chiefly subject to deformation according to its axis of revolution, but is relatively rigid in its radial directions owing to the aforesaid disposition, the device for securing the engine or similar apparatus will offer a relatively great elasticity in the direction of the reaction torque, that is, relatively to the axis of the driving shaft or of the parts in movement, but it will offer a great resistance to the other movements of the said engine or other apparatus relatively to the support.

Thus the said device provides for a partially rigid fixation of the engine or other apparatus, while at the same time preventing the transmission of the greatest vibrations and stresses resulting from the reaction torque.

It is to be noted that the elastic displacement of the engine or other apparatus relatively to the frame may be utilized, and chiefly on the test bed, for the measurement of the reaction torque.

The elastic rings will preferably consist of pneumatic devices adapted for adjustable pressure, or connected with the atmosphere.

In the accompanying drawings, which are given solely by way of example:

Fig. 1 is a front view, with parts broken away, of an arrangement according to the invention for securing to the structure of a flying machine or the like, a casing or frame to which is to be rigidly secured, in the overhung position, an engine of any kind, not shown, which may be of the radial type, for example.

Fig. 2 is a corresponding side view.

Fig. 3 represents a modification, in which the engine is secured at both ends.

According to the example of execution represented in Figs. 1 and 2, the question relates to the mounting, on the structure 1 of a flying machine or the like, of a frame or casing 2 upon which is to be rigidly secured, by any of the usual means, for instance upon the ring 3, an engine of any kind, for example an engine of the radial type, the extension X—X of the axis of the crankshaft being perpendicular, or practically perpendicular, to the plane Y—Y (Fig. 2) of the structure 1 to which the frame 2 is to be secured.

In this plane Y—Y, to the structure 1 are secured, by bolts 4 or otherwise, a certain number (four for example) of hollow members 5. To the said members 5 are secured, by bolts 6 or the like, other hollow members 7, in such manner that each assembled device 5—7 will form a torus-shaped casing of semi-circular or like section, the plane of symmetry Z—Z of which (Fig. 1) is radial, or practically radial, i. e. is in coincidence, or practically in coincidence, with the axis X—X. In other words, the axes U—U of the said torus-shaped casings are situated in a common transverse plane V—V (Fig. 2), perpendicular to the axis X—X, and in this plane, each of the axes U—U is perpendicular, or pract. ally perpendicular to the corresponding radius Z—Z.

Each casing 5—7 surrounds, at the exterior, a pneumatic ring consisting, for example, of an outer cover 8 of India rubber or rubber cloth. The said outer cover 8 is connected by its beads 8ª, through the intermediary of an internal rim 9, to two metallic cheeks 10. The said cheeks 10 are traversed by an axle 11, either solid or tubular. The said axle 11, traverses, in turn, the lugs 12 which are mounted on the frame 2, and they are either cast in one with the latter or are separately secured thereto. A shoulder 13 (Fig. 1) of the axle 11 and a nut 14 (or two nuts) secure the whole device together.

In the interior of each outer cover 8 is located an inner tube 15 which is inflated according to needs.

The frame 2, to which the engine or other apparatus is rigidly secured, may comprise cut-out parts 16 for reducing the weight, and these will preferably provide for solid parts at the bottom, 17, forming cross-pieces between the lugs 12 of the different securing devices.

It will be at once observed that by reason of the great elasticity of each pneumatic ring, according to its axis U—U, the rod or tube 11 used for connection may be displaced in one direction or the other upon the said axis U—U. As the said axis is perpendicular or practically perpendicular to the corresponding radius Z—Z, the frame 2 and the engine or other apparatus which is mounted on the frame 2 may be given a certain oscillatory movement about the axis X—X, under the effect of the reaction torque, this oscillatory movement being moreover gradually damped according as the oscillation of the frame 2 takes place. The result will be that if the said reaction torque maintains a constant value, the frame 2 will remain in a given angular position, the readily estimated value of which, taking the structure 1 as a basis, can be utilized in order to estimate the value of the reaction torque.

In the different directions of the axis U—U, for instance in the radial directions such as Z—Z, each ring 8 will offer a great resistance, and thus the connection between the structure 1 and the frame 2 is practically rigid in these directions, and in particular, the plane V—V for the connection remains practically stationary with reference to the plane Y—Y of the structure 1.

Fig. 3 represents a modification, in which the engine 20, which has a great length, cannot be supported in the overhung position, but must be maintained at its end farthest from the frame 2. The engine 20 is mounted, at its end farthest from the frame 2, upon a bracket 21 which has the form of a large fork with two parallel branches which are situated on the respective sides of the engine. The said bracket 21 is firmly secured at 22 to the structure 1, and the ends of its two branches are secured to the front end of the engine through the intermediary of an elastic ring 23, the outer casing 24 of which is firmly secured to the bracket 21; its internal rim 25 has mounted thereon, preferably through the intermediary of ball bearings 26, a ring 27 which is secured to the projecting end of the engine 20. The axis of the ring 23 coincides with the axis X—X of the engine, and thus the radial displacements which are to be especially impeded are in fact elastically counteracted.

Obviously, the invention is not limited to the embodiments herein represented and described, which are given solely by way of example.

The pneumatic devices comprising an inner tube and operating at variable pressure may be replaced by any other pneumatic devices, with or without inner tube, and chiefly by pneumatic devices operating at atmospheric pressure, without inner tube or valve, of the system which is known as "automatic pneumatic device".

In the examples above set forth, the frame 2, that is, the engine or like apparatus, is secured to the internal rim 9, and the external rims 5—7 are secured to the support 1, but it is obvious that one might proceed inversely, thus securing the engine to the external rims 5—7, and the internal rims 9 will in this case be secured to the structure 1 or like support.

On the other hand, as concerns the connections between the engine or like device and the controlling devices which are located at a distance, for instance in the cockpit, such connections may be made in the usual manner, or by means of flexible members allowing relative displacements about the axis X—X, or by providing the frame 2 supporting the engine with extensions or appendages leading to the cockpit and directly provided with the controlling devices, which are thus out of the way of the displacements of the engine with respect to the structure 1.

The said device may be provided with all suitable safety means, such as studs or the like, adapted for automatic release, permitting the direct connection of the members which are normally joined together by the pneumatic rings, in the case in which the said rings should be deflated.

Having now described our invention what we claim as new and desire to secure by Letters Patent is:

1. In a suspension for an apparatus having parts rotating or oscillating about an axis, in combination a supporting member, a supported member secured on said apparatus, a plurality of pneumatic annular tubes distributed about said axis of rotation and at a distance from said axis, each of said pneumatic annular tubes being disposed in such manner that the axis of said pneumatic annular tube is substantially situated in a plane at right angles with said axis of rotation and is substantially tangent to a circumference in said plane coaxial with said axis of rotation, and for each pneumatic annular tube two concentrically disposed attaching means, one of said attaching means being secured on one of said supporting and supported members and engaging the outer circumference of said tube, and the other attaching means being secured on the other of said members and engaging the inner circumference of said tube.

2. In a suspension for an apparatus having parts rotating or oscillating about an axis, in combination a supporting member, a supported member secured on the side of said apparatus adjacent said supporting member, a plurality of pneumatic annular tubes distributed about said axis of rotation and at a distance from said axis, each of said pneumatic annular tubes being disposed in such manner that the axis of said pneumatic annular tube is substantially situated in a plane at right angles with said axis of rotation and is substantially tangent to a circumference in said plane coaxial with said axis of rotation, for each pneumatic annular tube two concentrically disposed attaching means, one of said attaching means being secured on one of said supporting and supported members and engaging the outer circumference of said tube, and the other attaching means being secured on the other of said members and engaging the inner circumference of said tube, a yoke secured on said supporting member and extending unto the side of said apparatus which is remote from said supporting member, concentrically clamping means secured on said yoke and on said side of said apparatus remote from said supporting member, and elastic means interposed between said clamping means.

EUGÈNE PROSPER RENAUX.
LUCIEN JULES RENAUX.